United States Patent [19]

Hioki

[11] Patent Number: 4,481,615

[45] Date of Patent: Nov. 6, 1984

[54] MOTOR CONTROLLING CIRCUIT OF REPRODUCING APPARATUS AND METHOD OF CONTROLLING

[75] Inventor: Toshiaki Hioki, Gifu, Japan

[73] Assignee: Sanyo Electric Co., Ltd., Japan

[21] Appl. No.: 342,904

[22] Filed: Jan. 26, 1982

[30] Foreign Application Priority Data

Feb. 2, 1981 [JP] Japan .................................. 56-14686
Jun. 9, 1981 [JP] Japan .................................. 56-89346
Jul. 23, 1981 [JP] Japan ................................ 56-116099

[51] Int. Cl.³ ............................................. G11B 17/00
[52] U.S. Cl. ..................................... 369/50; 358/338; 358/342
[58] Field of Search ..................... 369/47, 50, 61, 62, 369/111, 48; 358/321, 322, 338, 342, 343; 360/73, 8, 19.1

[56] References Cited

U.S. PATENT DOCUMENTS

| | | | |
|---|---|---|---|
| 3,909,512 | 9/1975 | Omori et al. ............................ | 360/8 |
| 3,939,302 | 2/1976 | Kihara .................................... | 369/48 |
| 4,223,349 | 9/1980 | Dakin et al. ........................... | 358/342 |
| 4,247,741 | 1/1981 | Tatsuguchi et al. ................... | 369/47 |
| 4,313,191 | 1/1982 | Winslow et al. ....................... | 369/50 |
| 4,338,683 | 7/1982 | Furukawa et al. ................... | 369/50 |
| 4,353,089 | 10/1982 | Winslow et al. ..................... | 358/342 |
| 4,390,977 | 6/1983 | Onigata et al. ....................... | 358/342 |

Primary Examiner—Donald E. McElheny, Jr.
Attorney, Agent, or Firm—Darby & Darby

[57] ABSTRACT

A reproducing apparatus comprises a motor (9) for driving a digital audio disk (1), in which digital data and a synchronizing signal are recorded. The digital data is modulated in accordance with a predetermined digital modulating system such as an EFM modulating system, and is then recorded, while the synchronizing signal is recorded which includes the repetition number of the signals of the maximum period included in the digital data which repetition number is larger than that in the digital data. A signal is reproduced from the disk and the reproduced signal is subjected to FM demodulation and then a control signal is generated based on the FM demodulated signal. The generated control signal as well as a reference signal is applied to a phase comparator (7) constituting a phase locked loop (10), whereby the phase locked loop controls the rotational speed of the motor.

18 Claims, 35 Drawing Figures

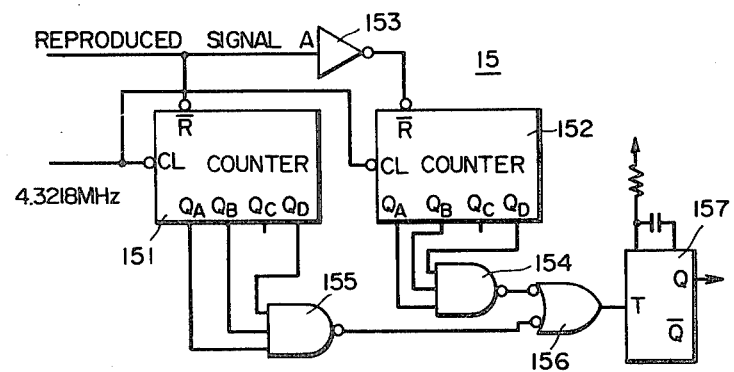
FIG.10
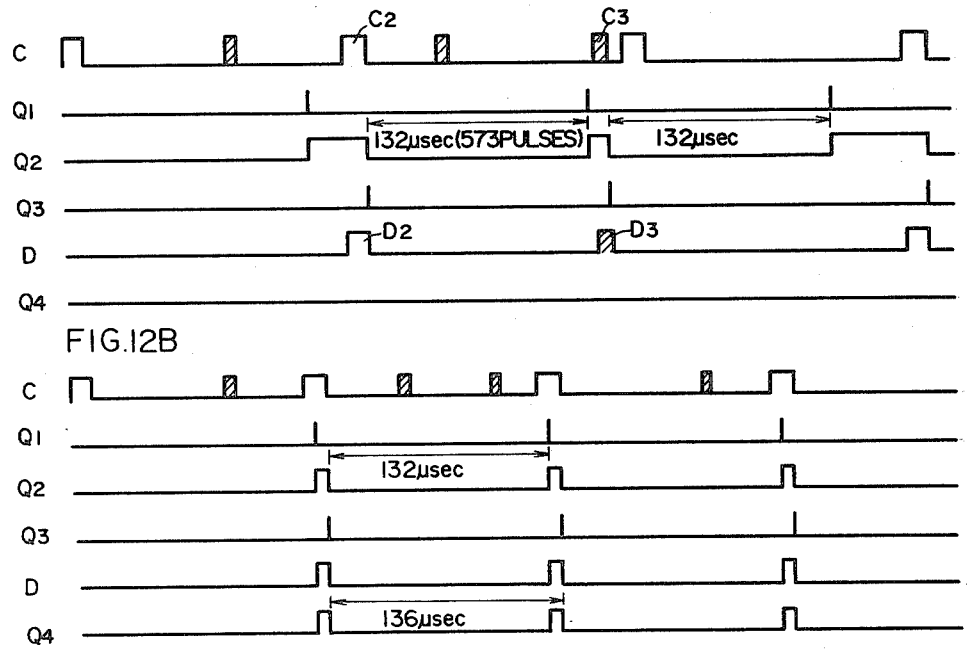
FIG.12A
FIG.12B

MOTOR CONTROLLING CIRCUIT OF REPRODUCING APPARATUS AND METHOD OF CONTROLLING

BACKGROUND OF THE INVENTION

1. Field of the Invention

The present invention generally relates to a motor controlling circuit of a reproducing apparatus and a method of controlling. More specifically, the present invention relates to a motor controlling circuit for controlling the rotational speed of a motor for driving a recording medium such as a digital audio disk responsive to a reproduced signal from the disk.

2. Description of the Prior Art

A recording medium such as an optical video disk has an FM modulating signal recorded on the surface of a disk made of vinyl chloride in an arrangement of pits in a spiral manner, for example. A disk of this type may be utilized as a PCM disk or a digital audio disk for recording and reproducing audio information, besides the above described video information, as a PCM (pulse code modulated) signal, for the purpose of making use of a broad frequency band characteristic thereof. In the case of a digital audio disk, digital data representing an audio signal is modulated in a proper digital modulating system such as 8-14 modulation (eight to fourteen modulation: EFM modulation) and is then recorded on a disk. Meanwhile, by EFM modulation is meant a digital modulating system in which data of 8 bits is converted into data of 14 channel bits.

Conventionally, recording of information into and reproduction of information from such video disk, digital audio disk and the like have been made in accordance with a CAV (constant angular velocity) system for maintaining constant the rotational speed of the disk or a CLV (constant linear velocity) system for maintaining constant the relative speed (linear speed) of a disk and a pickup. According to the CAV system, the upper limit of the recording density is restricted by that in the innermost circumference of the disk, while the recording density at the outermost circumference of the disk decreases as small as several times that at the innermost circumference and accordingly the utilization efficiency of the disk area is less good. On the other hand, according to the CLV system, the relative speed (linear speed) of a disk and a pickup is made constant without regard to the outermost circumference and the innermost circumference of the disk and as a result the disk area is effectively utilized and the disk can be made compact or the amount of recorded information can be increased as compared with the CAV system. However, in the case of the CLV system, the rotational speed of a disk and thus of a motor need be continuously changed as a pickup moves from the outermost circumference to the innermost circumference or from the innermost circumference to the outermost circumference of a disk.

One example of a motor controlling apparatus for such CLV system is disclosed in Japanese Patent Laying Open No. 9907/1979 laid open Jan. 25, 1979, for example. Particularly, the referenced laying open gazette discloses an apparatus adapted for detecting the position of a pickup in the radial direction of a disk by means of a potentiometer, properly processing the output of the potentiometer to prepare a proper function and controlling the rotational speed of the motor in accordance with the function. However, the technology described in the referenced laying open gazette involves a problem that the same can not be applied to a disk of a different linear speed unless the function is changed accordingly and hence is not of versatility.

Thererfore, in order to provide such versatility, it is desired to control the rotational speed of a motor by the use of a reproduced signal from a disk. Usually a disk has information of a number of frames recorded each frame including a data synchronizing signal and data. The data synchronizing signal can be used as a signal for controlling the rotational speed of a motor in the CLV system. However, in reproducing a signal recorded in a digital modulating system of such as EFM modulation in the case of a disk of the CLV system, digital demodulation can not be made of the data synchronizing signal and the data unless a predetermined number of rotations is reached on the occasion of reproduction. Accordingly, in such a case it was extremely difficult to control with high accuracy the rotational speed of the motor by the use of a signal reproduced in a digital manner from the disk.

SUMMARY OF THE INVENTION

A reproducing apparatus in which the present invention can be employed reproduces a video signal or an audio signal from a recording medium such as a disk having digital data and a synchronizing signal recorded. The digital data is modulated in accordance with a predetermined digital modulating system and is recorded in a recording medium. The synchronizing signal is recorded such that the signal of the maximum period included in the digital data may have the repetition number larger than that in the digital data. A signal is reproduced from the recording medium in accordance with the driving of the recording medium by means of a motor and the reproduced signal is FM demodulated. A control signal is generated based on the FM demodulated signal and the rotational speed of the motor is controlled in accordance with the control signal.

According to the present invention, the rotational speed of the motor can be controlled in accordance with the reproduced signal obtained from the recording medium and therefore more versatility is provided as compared with that disclosed in the above referenced Japanese Patent Laying Open Gazette. In addition, since the reproduced signal is FM demodulated and the control signal is generated based on the FM demodulated signal, control of motor can be performed even when the speed of the recording medium and thus of the motor has not reached a predetermined speed and accordingly the rotational speed of the motor can be controlled with stability and accuracy. As a result, accurate demodulation of digital data can be achieved.

In a preferred embodiment of the present invention, after the recording medium and thus the motor has reached a predetermined speed, a control signal is generated based on the digital demodulated signal. The reason is that in the case where the reproduced data synchronizing signal is missing due to dropout or the like such loss can not be compensated by an analog detecting method utilizing the FM demodulating circuit whereas the digital detecting method utilizing the phase locked loop, for example, can generate a synchronizing signal compensating the same when the reproduced data synchronizing signal is missing, which makes it possible to control the motor with stability and accuracy.

The control signal is obtained by extracting a signal having the periodicity from the FM demodulated signal. Furthermore, the control signal is based on a signal from a clamping circuit for clamping the FM demodulated signal and utilizes the output obtained after separation by predetermined interval from the previous output from the clamping circuit as a control signal in the case where the speed of the recording medium and thus of the motor is equal to a predetermined speed or is slower than that. In the case where the rotational speed of the motor is faster than the predetermined speed, the output as such from the clamping circuit can be utilized as a control signal or alternatively a control signal may be obtained by adding another signal to the output from the clamping circuit.

In another embodiment of the present invention, the rise and fall of the reproduced signal from the recording medium are each $\frac{1}{2}$ frequency divided and the thus $\frac{1}{2}$ frequency divided signals are then FM demodulated and the FM demodulated signals are clamped, thereby to provide a control signal. According to this approach, an influence caused by the noise which occurs due to the signal of the maximum period included in the digital data is almost eliminated and accordingly an accurate control signal is obtained.

Accordingly, a principal object of the present invention is to provide a motor controlling circuit of a reproducing apparatus and a method of controlling that can control the rotational speed of a motor with stability and accuracy even when the rotational speed of the motor has not reached a predetermined speed.

One aspect of the present invention resides in a motor control circuit of a reproducing apparatus for controlling the rotational speed of a motor by the use of a synchronizing signal included in a signal reproduced from a recording medium and digitally demodulated after the rotational speed of the motor has reached a predetermined speed.

Another aspect of the present invention resides in a motor control circuit that can make constant the linear speed of a disk on the occasion of reproduction with stability and accuracy in a reproducing apparatus of a disk in which a video signal or an audio signal is recorded in the form of digital data with a constant linear speed.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 10 is a diagram showing one example of a rotational speed detecting circuit in the FIG. 7A embodiment;

FIGS. 12A and 12B are timing charts for explaining the operation of the FIG. 11 diagram;

DESCRIPTION OF THE PREFERRED EMBODIMENTS

Figure 1:
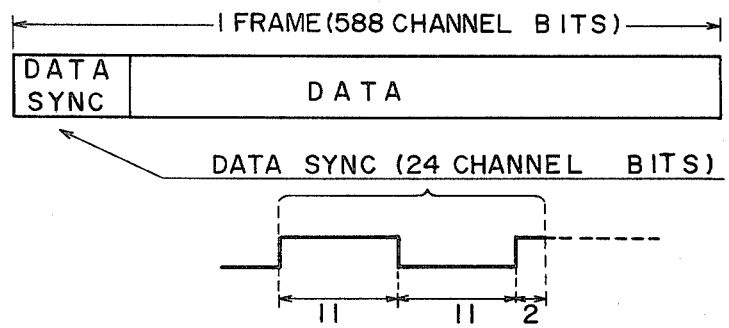
FIG. 1 is a view showing one example of a recording format of a digital audio disk that can be used in the present invention.

FIG. 1 is a view showing one example of a recording format of a digital audio disk that can be used in the present invention. A PCM disk such as a digital audio disk constituting the background of the present invention employs an EFM modulating system as an example of a digital modulating system. However, the digital modulating system may employ any other various modulating systems and is not limited to the EFM modulating system. The disk, not shown, has a plurality of frames recorded, each frame including say 588 channel bits. Each frame comprises data modulated in accordance with the EFM modulating system and a synchronizing signal for synchronization with the data. The 24 channel bits at the top out of the 588 channel bits are allotted for the above described synchronizing signal. The data synchronizing signal includes the pulses of only one period of the 11 channel bits. The logical state of the synchronizing signal may be inverted completely with respect to the state shown in FIG. 1 in accordance with a state of the preceding data. The digital data is EFM modulated and is recorded as described previously. The 8 bit data is converted into the data of 14 channel bits through EFM modulation and accordingly the amount of data that can be represented with 14 channel bits is larger than the amount of data that can be represented with 8 bits as a matter of course, which means that some restriction can be allotted to the data of 14 channel bits. For example, assuming that the data of 14 channel bits is recorded in accordance with the NRZI system, a restriction can be made that the signal inversion interval is larger than 3 channel bits and is smaller than 11 channel bits and that the signal inversion interval of 11 channel bits does not occur continuously. When the data is thus modulated and recorded, it follows that the pulses of 11 channel bits are included for a half of the period but there is no pattern which is the same as that of the data synchronizing signal. Accordingly, a signal is reproduced with a pickup from a disk having the data synchronizing signal and the data recorded in the above described manner and the reproduced signal is directly FM demodulated without being digitally demodulated, whereby the data synchronizing signal can be obtained. The present invention pays attention to this point.

Figure 2:
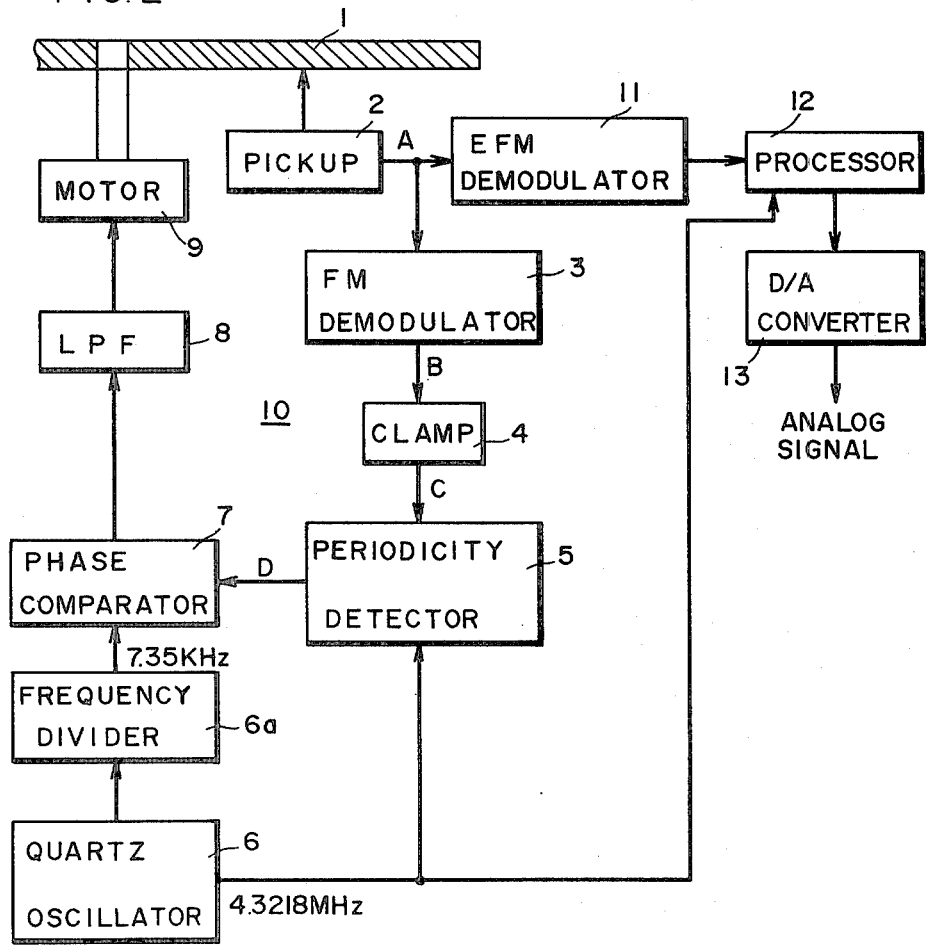
FIG. 2 is a block diagram showing one embodiment of the present invention.
Figure 3:
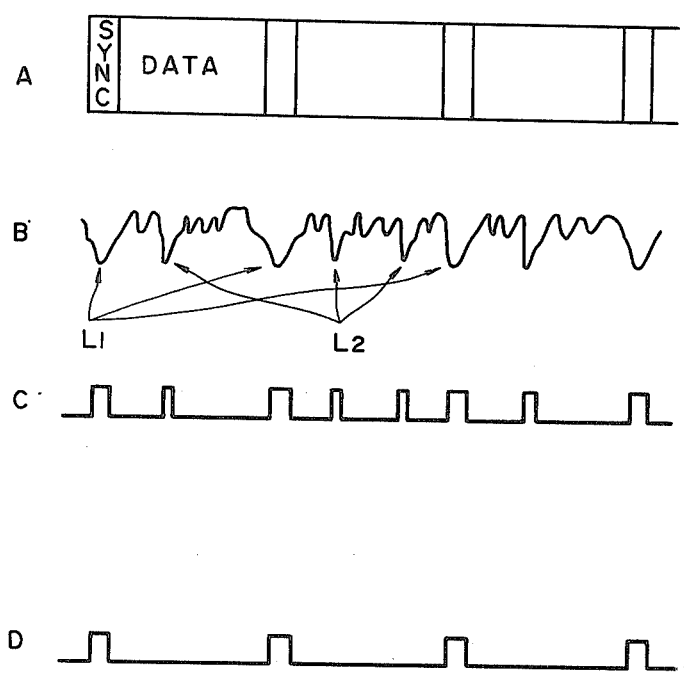
FIGS. 3A-3D is a graph showing waveforms for explaining the operation of the FIG. 2 embodiment.

FIG. 2 is a block diagram showing one embodiment of the present invention. FIG. 3 is a graph showing waveforms for explaining the operation of the embodiment. The signal recorded in a disk 1 is reproduced (see waveform A in FIG. 3) by a pickup 2 serving as a device for converting optically, electromechanically or electrostatically into an electrical signal a recorded signal recorded on the disk in accordance with a recording system, and the reproduced signal is applied to an FM demodulating circuit 3. Then an FM demodulated signal, as shown as waveform B in FIG. 3, is obtained from the FM demodulating circuit 3. In the case of the FM demodulation, such demodulated signal B can be obtained in a given range of the disk rotation number in accordance with the so-called S-curve characteristic. Since a synchronizing signal portion is of the lowest frequency in the reproduced signal, the FM demodulated signal becomes the minimum voltage level L1, while the data portion is of the frequency higher than that of the synchronizing signal portion and the FM demodulated signal becomes the voltage level higher than that of the synchronizing signal portion. However, the data portion also includes a signal which is of the same frequency as that of the synchronizing signal portion, that portion becomes of the same voltage level L2 as that of the synchronizing signal portion. When the demodulated signal B is applied to a clamping circuit 4, the portion of the low voltage level is extracted and a pulse as shown as waveform C in FIG. 3 is obtained. In order to extract only periodical pulses D from the pulse train C, it is necessary to find out the periodicity of the pulses. More specifically, although the synchronizing pulses D take place periodically, the pulses in the data portion take place only at random. Therefore, by applying the pulse train C to a periodicity detecting circuit 5, only the synchronizing pulses D can be obtained, as to be described subsequently (see waveform D in FIG. 3).

Phase comparison is made by means of a phase comparator 7 of the synchronizing pulse and the reference signal from a quartz oscillator 6 and thus from a frequency divider 6a and an error output is applied through a low-pass filter 8 to a motor 9, so that the rotation of the motor 9 may be controlled to be stable. More specifically, the pickup 2, the FM demodulating circuit 3, the clamping circuit 4, the periodicity detecting circuit 5, the quartz oscillator 6, the phase comparator 7, the low-pass filter 8 and the motor 9 constitute a phase locked loop 10, whereby the rotation of the motor 9 is controlled with stability and accuracy.

After the rotation of the motor thus came to be controlled with accuracy, accurate demodulation of the digital data can be made. More specifically, after the reproduced signal A is applied to an EFM demodulating circuit 11 and is digitally demodulated, the same is applied to a digital processing circuit 12. The processing circuit 12 is also connected to receive a signal from the quartz oscillator 6 and processing such as synchronizing control, error correction and the like of the demodulated digital data is made in the digital processing circuit 12 and the output is then applied to a digital/analog converter 13, whereby the signal is converted into an audio signal, i.e. an analog signal. Since such demodulation of the data and conversion to an analog signal are not the subject matter of the present invention, it would be appropriate to omit a detailed description thereof for simplicity of description.

Figure 4:
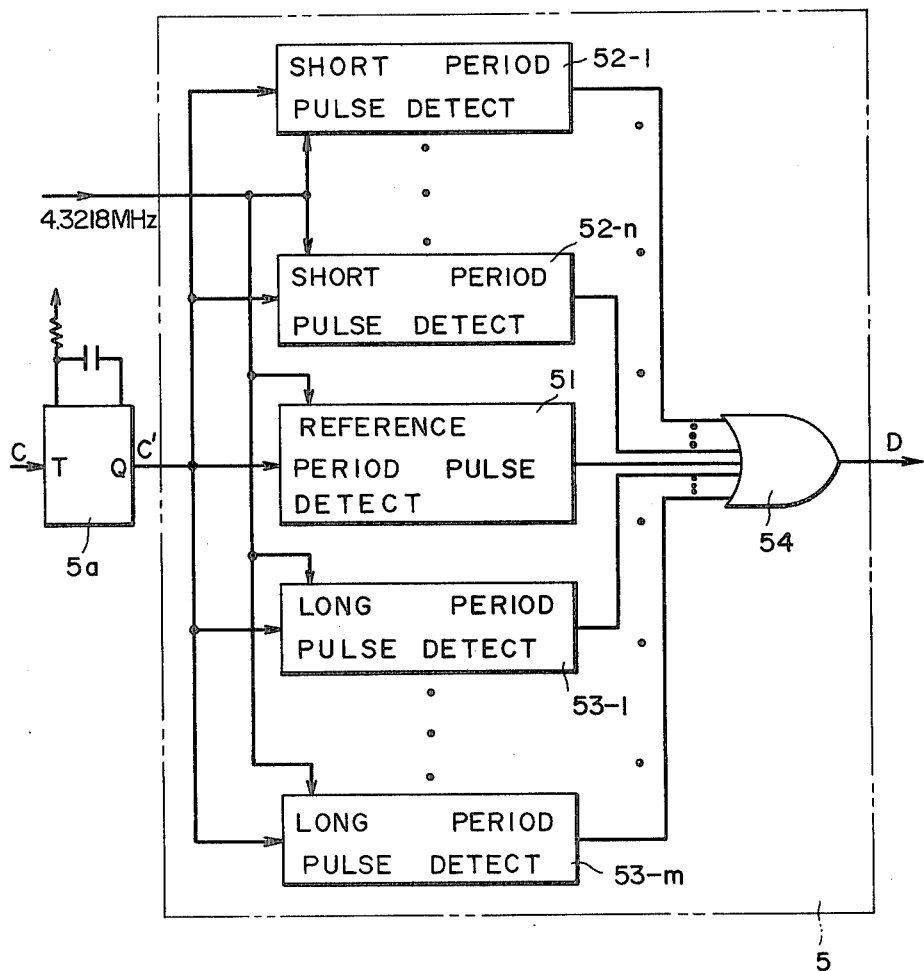
FIG. 4 is a block diagram showing a preferred example of a periodicity detecting circuit in the FIG. 3 embodiment.

FIG. 4 is a block diagram showing one example of a periodicity detecting circuit. A retriggerable one-shot circuit 5a is coupled to the periodicity detecting circuit 5 and is connected to receive a pulse train C from the clamping circuit 4. The retriggerable one-shot circuit 5a has been adapted such that the time constant thereof covers the width of 22 channel bits so that all the pulses included in the given pulse train C may have the same width. The pulse train C' having the same width (see FIG. 6) is applied to a reference period pulse detecting circuit 51, short period pulse detecting circuits 52-1 to 52-n and long period pulse detecting circuits 53-1 to 53-m. The reference period pulse detecting circuit 51 can detect a pulse train having a period between 588±11 channel bits. The short period pulse detecting circuits 52-1 to 52-n can detect a pulse train having a period between (588−22·i)±11 channel bits, where i is an arbitrary number of 1 to n and corresponds to the numeral at the end of reference numeral of the short period pulse detecting circuit. The long period pulse detecting circuits 53-1 to 53-m can detect the pulse train having a period between (588+22·j)±11 channel bits, where j is an arbitrary number of 1 to m and corresponds to the numeral at the end of reference numeral of the long period pulse detecting circuit. The respective pulse detecting circuits 51, 52-1 to 52-n and 53-1 to 53-m receive the signal of 4.3218 MHz from the quartz oscillator 6 (FIG. 2).

The reference period pulse detecting circuit 51 detects the periodical pulses obtainable when the motor 9 and thus the disk 1 runs at a predetermined rotational speed. The long period pulse detecting circuits 53-1 to 53-m detect period pulses obtainable when the disk 1 runs at the speed slower than the predetermined rotational speed, and the short period pulse detecting circuits 52-1 to 52-n detect the periodical pulses obtainable when the disk 1 runs at the speed faster than the predetermined rotational speed. Thus the periodical pulses are detected at any rotational number and the output is obtained through an OR gate 54 and is obtained from the circuit 5 as a control signal D.

Figure 5:
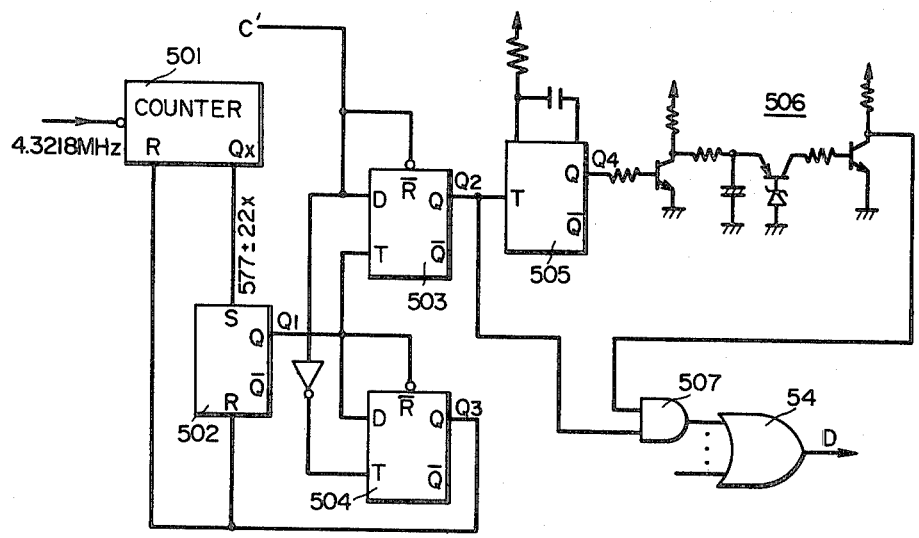
FIG. 5 is a schematic diagram showing one example of a periodical pulse detecting circuit in the FIG. 4 diagram.
Figure 6:
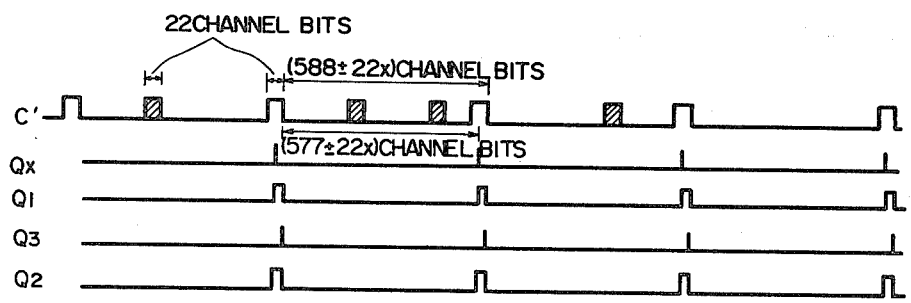
FIG. 6 is a timing chart for explaining the operation of the FIG. 5 diagram.

FIG. 5 is a diagram showing one example of the period pulses detecting circuit in FIG. 4. FIG. 5 shows only one pulse detecting circuit, representing the others. Referring to FIG. 5, a counter 501 is supplied with clock signals of 4.3218 MHz obtained from the quartz oscillator 6, which frequency is the frequency of channel bits. The counter 501 measures a time period corresponding to (577−22·i) channel bits or (577+22·j) channel bits from the fall of the pulse train C' shown in FIG. 6. The pulse train C' is applied to a D-type flip-flop 503. Accordingly, if and when pulses exist in the pulse train C' at the time point after the lapse of a time period corresponding to (577−22·i) channel bits or (577+22·j) channel bits from the fall of the pulse train C', i.e. at the timing when the countup output Qx shown in FIG. 6 is obtained from the counter 501, the output Q2 (FIG. 6) is obtained from the flip-flop 503. Meanwhile, the fall of the pulse train C' is detected by a flip-flop 504. More specifically, the output Q3 (FIG. 6) of the flip-flop 504 is obtained responsive to the fall of the pulse train C' and a flip-flop 502 and a counter 501 are reset responsive to the output Q3 of the flip-flop 504.

As described above, the pulses having periodicity are obtained from the output Q2 of the flip-flop 503. The retriggerable one-shot circuit 505 is triggered responsive to the output Q2 of the flip-flop 503 and the output Q4 thereof becomes the high level. The output Q4 of the high level is applied to an integrating circuit 506 and is integrated. The output of the integrating circuit 506 and the output Q2 of the flip-flop 503 are both applied to an AND gate 507. More specifically, the integrating circuit 506 is provided for the purpose of confirming whether the output Q2 is of periodicity. Meanwhile, the time constant of the retriggerable one-shot circuit 505 is selected to be larger than (599−22·i) channel bits or (599+22·j) channel bits. Thus, eventually the output from the AND gate 507 are the periodical pulses, i.e. the synchronizing pulses D and is applied to the phase comparator 7 (FIG. 2) through the OR gate 54.

Figure 7A:
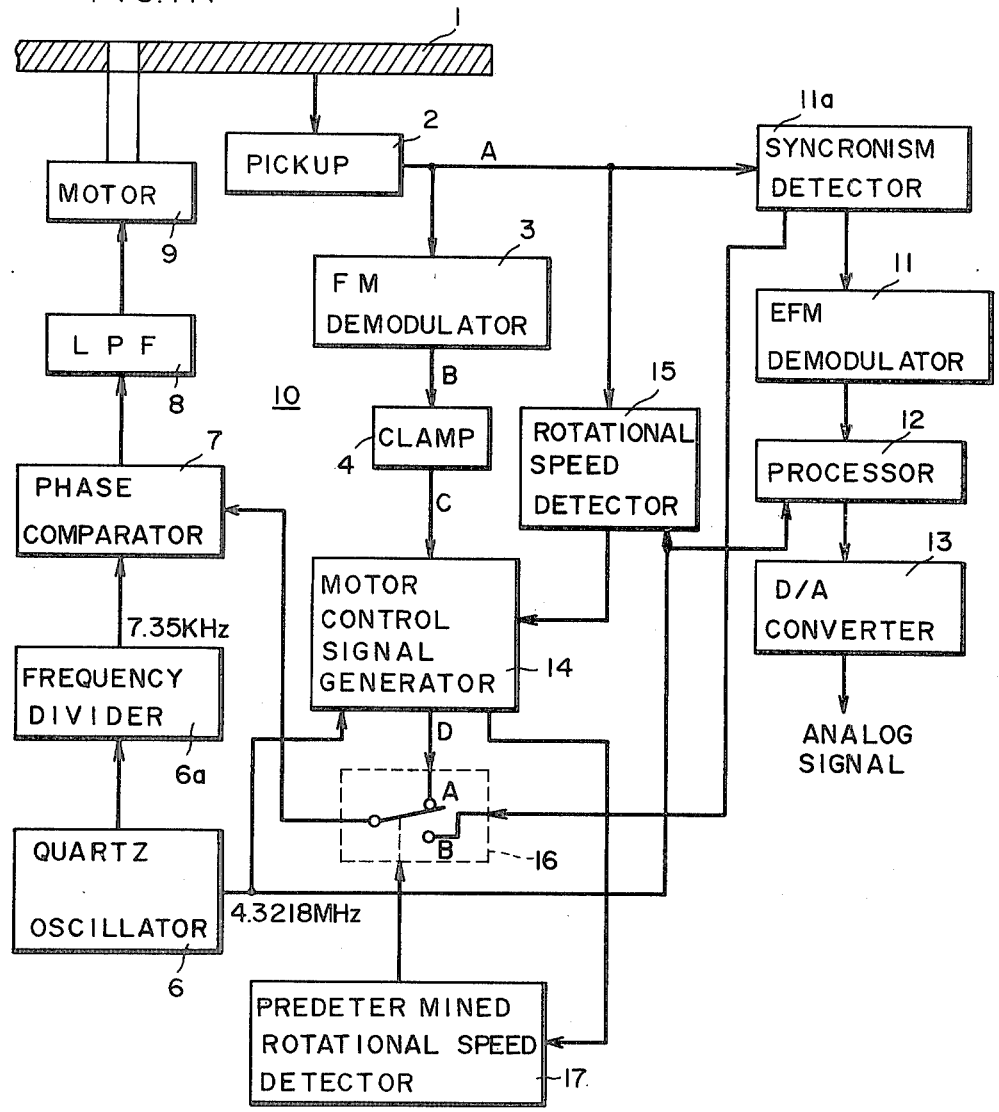
FIG. 7A is a block diagram showing another embodiment of the present invention.
Figure 8:
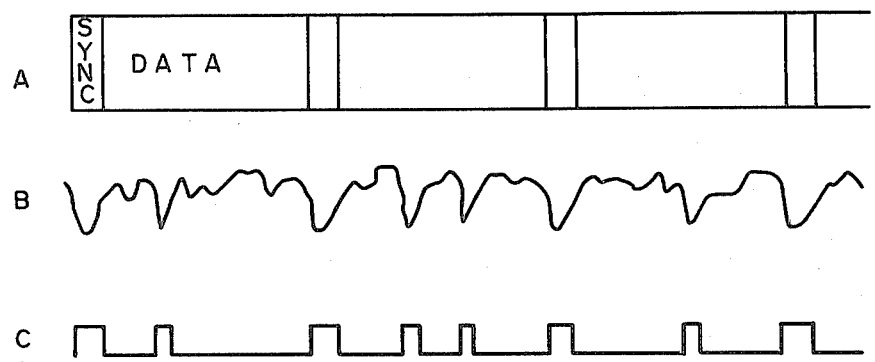
FIGS. 8 consisting of A-C and 9A to 9C are graphs showing waveforms for explaining the operation of the FIG. 7A embodiment.

FIG. 7A is a block diagram showing another embodiment of the present invention. The signal recorded on the disk 1 is reproduced (see waveform A in FIG. 8) by the pickup 2 serving as a device for converting optically, electromechanically or electrostatically into an electrical signal a signal recorded on the disk in accordance with the recording system and the reproduced signal is applied to the FM demodulating circuit 3. An FM demodulated signal as shown as waveform B in FIG. 8 is obtained from the FM demodulating circuit 3. In the case of FM demodulation, such demodulated signal B can be obtained in a given range of the disk rotational number in accordance with the so-called S-curve characteristic. Meanwhile, since the synchronizing signal portion is of the lowest frequency in the reproduced signal, the demodulated signal becomes the minimum voltage level for the synchronizing signal portion, whereas since the data portion is of the frequency higher than that of the synchronizing signal portion the demodulated signal becomes higher than the voltage level of the synchronizing signal portion. However, since the data portion also includes a signal of the same frequency as that of the synchronizing signal portion as described previously, the demodulated signal becomes the same voltage level as that of the synchronizing signal portion. When such demodulated signal (see waveform B in FIG. 8) is applied to the synchronizing separator or clamping circuit 4, the low voltage level portion is clamped and a pulse train as shown as waveform C in FIG. 8 is obtained. The pulse train C includes a true synchronizing signal and a false synchronizing signal.

The pulse train C is applied to a motor control signal generating circuit 14. The motor control signal generating circuit 14 generates a motor control signal D based on the pulse train C in association with the rotational speed of the disk at that time. The relation is shown in FIGS. 9A to 9C.

Figure 9A:
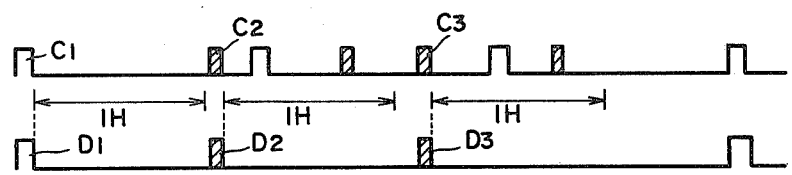

FIG. 9A shows a case where the disk is of a speed lower than the predetermined rotational speed. Now it is assumed that one pulse signal C1 is noted and a pulse signal C2 appearing for the first time after separation by a predetermined interval 1H from the fall of the pulse signal C1 is used as a motor control signal D2. The predetermined interval 1H is defined as a separation from the fall of the preceding synchronizing signal up to an approximate central position of the succeeding synchronizing signal in the case where the disk has been running at a normal linear speed (see FIG. 1). Then it is assumed that a synchronizing signal C3 appearing for the first time after separation by the predetermined interval 1H from the thus detected synchronizing signal C2 is used as a motor control signal D3. Likewise, a motor control signal D is obtained from the pulse train C. The motor control signal D thus obtained includes a true synchronizing signal and a false synchronizing signal (shown as hatched) but the frequency thereof becomes smaller than the normal frequency and, when the same is applied to the phase comparator constituting a phase locked loop 10, the phase locked loop comes to operate so that the rotational speed of the disk may be made faster.

Figure 9B:
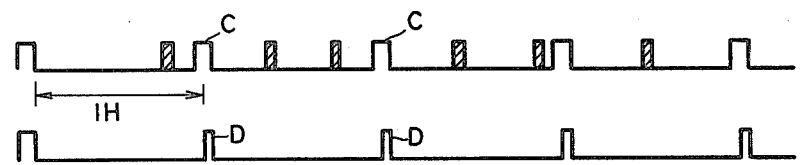

FIG. 9B shows a case where the disk has been running at a predetermined rotational speed. In such a case, as similar to the case shown in FIG. 9A, the synchronizing pulse C appearing for the first time after separation by the predetermined interval 1H is used as a motor control signal D. Then the motor control signal D comes to correspond to a true synchronizing pulse C and the frequency thereof comes to coincide with the normal one.

Figure 9C:
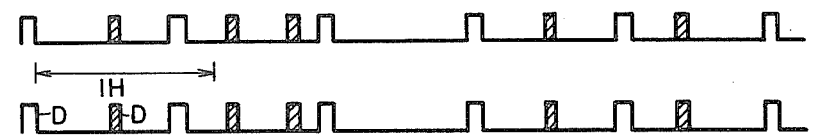

FIG. 9C shows a case where the disk is running at the speed higher than the predetermined rotational speed. In such a case, all the pulse train C (thus including a true synchronizing sinal and a false synchronizing signal) is used as a motor control signal D. Such motor control signal D would become higher than the normal frequency. Therefore, when the same is applied to the phase locked loop, the phase locked loop comes to function so that the rotational speed of the disk may be made slower.

Meanwhile, in order to achieve the above described operation by the motor control signal generating circuit 14, it is necessary to detect whether the disk is running faster or slower than the predetermined rotational speed and to that end such detection is performed by a rotational speed detecting circuit 15. The details of the rotational speed detecting circuit 15 and the motor control signal generating circuit 14 will be described subsequently.

The motor control signal D thus generated is applied through an A contact side of a switch means 16 to the phase compartor 7 constituting the phase locked loop 10 as a comparison singal, as described previously. On the other hand, the phase comparator 7 is also connected to receive at the other input as a reference signal the frequency divided output of the frequency 7.35 KHz obtained by frequency dividing by the frequency divider 6a the oscillation pulse from the quartz oscillator 6 which makes oscillation at the oscillation frequency of 4.3218 MHz. Meanwhile, the frequency of 7.35 KHz is the frequency of the true synchronizing signal in the case where the rotational speed of the disk becomes a normal speed and the linear speed becomes constant. The comparison signal and the reference signal are phase compared by the phase comparator 7 and an error output is applied through the low-pass filter 8 to the motor 9 so that the rotation of the motor 9 is controlled so that the linear speed may be constant. More specifically, the pickup 2, the FM demodulating circuit 3, the clamping circuit 4, the motor control signal generating circuit 14, the phase comparator 7, the quartz oscillator 6, the frequency divider 6a, the low-pass filter 8 and the motor 9 constitute the phase locked loop 10, whereby the rotation of the motor 9 is controlled with stability and accuracy.

After the disk reaches a predetermined rotational speed, the digital data can be accurately demodulated. More specifically, first the synchronizing signal detecting circuit 11a detects a synchronizing signal in a digital manner. This can be done by demodulating the clock based on the reproduced signal of the NRZI system reproduced by the pickup by the use of the phase locked loop and by detecting a specified pattern having the synchronizing signal. Furthermore, conversion is made to the original data of 8 bits by the EFM demodulating circuit 11 and then the output is applied to the digital processing circuit 12 so that error detection, correction and the like of the data may be performed. Thereafter the output is converted into an audio signal (analog signal) by means of the digital/analog converter 13. The details of these circuits are not the subject matter of the present invention and therefore it would be appropriate to omit a detail description thereof for simplicity of description.

Meanwhile, after the disk has reached the predetermined rotational speed and the linear speed has become constant and detection of the synchronizing signal in a digital manner becomes possible, it would be convenient to control the motor with the synchronizing signal detected in a digital manner. The reason is that in the case where the reproduced data synchronizing signal is missing due to dropout or the like such loss can not be compensated by an analog detecting method utilizing the FM demodulating circuit 3 whereas the digital detecting method utilizing the phase locked loop, for example, can generate a synchronizing signal compensating the same when the reproduced data synchronizing signal is missing, which makes it possible to control the motor with stability and accuracy. Therefore, according to the embodiment in discussion, when it is detected by the predetermined rotational speed detecting circuit 17 that the disk has reached a predetermined rotational speed the switch means 16 is turned to the B contact side so that the synchronizing signal obtained from the data synchronizing signal detecting circuit 11a is applied to the phase locked loop 10.

A motor for a disk in accordance with the CLV system can thus be controlled with stability and accuracy in accordance with the above described method. Such method of course can be applied to a control of a motor of a disk in accordance with the CAV system.

Now the motor control signal generating circuit 14, the rotational speed detecting circuit 15, and the predetermined rotational speed detecting circuit 17 out of the previously described circuits will be more specifically described in the following.

The details of the rotational speed detecting circuit 15 are depicted in FIG. 10. As described previously, assuming that the pattern of the synchronizing signal is set as shown in FIG. 1 and the data is EFM modulated and is recorded in accordance with the NRZI system, then it follows that the maximum signal inversion interval of the signal reproduced by the pickup 2 would be 11 channel bits. Therefore, the pulses of the frequency of 4.3218 MHz obtained from the quartz oscillator 6 are used as clock pulses and the maximum signal inversion interval is measured by the use of the counters 151 and 152. The counter 151 is used to measure the maximum signal inversion interval of the high level and the counter 152 being supplied with the signal reproduced by the pickup 2 through the inverter 153 is used for determining the maximum signal inversion interval of the low level. More specifically, the counters 151 and 152 are placed in a reset state when the low level signal is applied to the reset terminal thereof while the same each count the clock pulses when the high level signal is applied thereto. Now assuming that the maximum signal inversion interval of the high level is measured by the counter 151, the outputs (QA, QB, QC and QD) of the counter 152 are all the logic zero and the output of the NAND gate 154 is logic one.

Now in the case where the rotational speed of the disk is equal to or smaller than the predetermined speed, the maximum signal inversion period becomes equal to or longer than the normal case and the counter 151 measures the numerical value "11". More specifically, the outputs QA, QB and QD each become the logic one and the output of the NAND gate 155 becomes the logic zero. Therefore, the output of the inverted OR gate or the NAND gate 156 becomes the logic one and the retriggerable one-shot circiut 157 is triggered, so that the output Q thereof becomes the high level.

On the other hand, in the case where the rotational speed of the disk is larger than the predetermined speed, the maximum signal inversion period becomes shorter than the normal case and the counter 151 does not measure the numerical value "11". More specifically, the output of the NAND gate 155 remains the logic one and the output of the NAND gate 156 is the logic zero. Therefore, the one-shot circuit 157 is not triggered and the output thereof becomes the low level. Thus a signal representing whether the rotational speed of the disk is faster or slower than the normal (predetermined) rotational speed can be obtained from the output of the one-shot circuit 157. Meanwhile, the quasistable period or the time constant of the one-shot circuit 157 is selected to be larger than 136 μsec. More specifically, the same is selected to be larger than the period of the synchronizing signal when the disk is rotating at the normal rotational speed ($1/7.35 \times 10^3$ sec=136 μsec).

Figure 11:
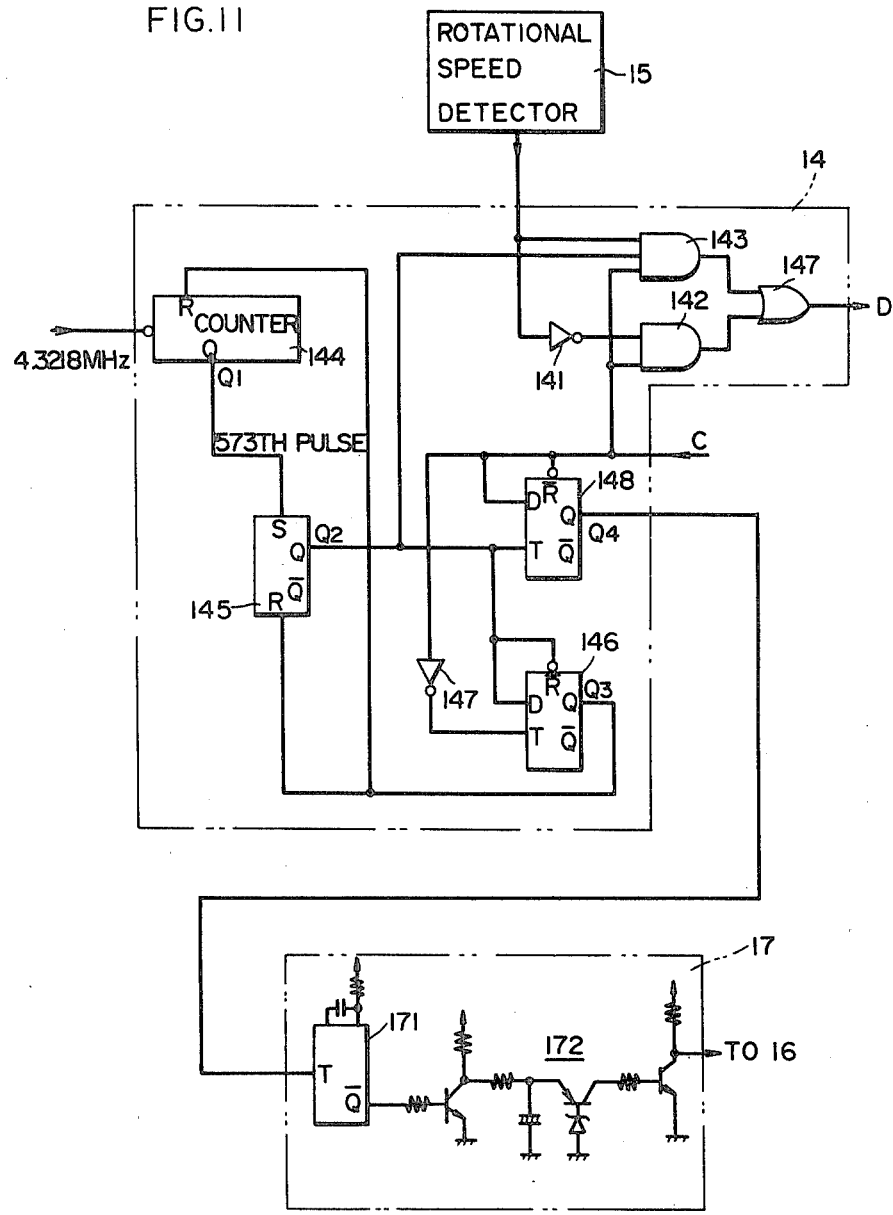
FIG. 11 is a diagram showing one example of a motor control signal generating circuit and a predetermined rotational speed detecting circuit in the FIG. 7A embodiment.

Now the details of the motor control signal generating circuit 14 and the predetermined rotational speed detecting circuit 17 will be described with reference to FIGS. 11, 12A and 12B.

Now assuming that the rotational speed of the disk is slower than the predetermined speed, the output of the rotational speed detecting circuit 15 becomes the high level as described previously. The output thereof is applied through the inverter 141 to the AND gate 142 and the AND gate 142 is not enabled, while the AND gate 143 is enabled when another condition is met. Now when the counter 144 for counting the clock pulses (the frequency 4.3218 MHz) obtained from the quartz oscillator 6 (FIG. 7A) counts the numerical value "573" correspoding to 1H as described previously, the output Q1 of the counter 144 becomes the high level and the flip-flop 145 is set and the output Q2 thereof becomes the high level. The output Q2 is applied to the reset terminal $\bar{R}$ and the data input terminal D of the D-type flip-flop 146. Therefore, the D-type flip-flop 146 is brought to an enabled state and the same is responsive to the rise of the clock input being applied to the clock input terminal T, thereby to store the data. More specifically, since the pulse train C has been applied through the inverter 147 to the T terminal of the flip-flop 146, the same is responsive to the fall of the pulse C2 to store data Q2, whereby the output Q3 of the flip-flop 146 becomes the high level. Since the output Q3 of the flip-flop 146 has been applied to the reset input of the flip-flop 145, the output Q2 of the flip-flop 145 immediately becomes the low level and the D-type flip-flop 146 is reset, whereby the output Q3 of the flip-flop 146 becomes the low level. The counter 144 is also reset responsive to the output Q3 of the high level. On the other hand, since the three inputs of the AND gate 143 all become the high level when the pulse C2 becomes the high level, the pulse C2 is obtained through the AND gate 143 and the OR gate 147 as a motor control signal D2. At that time, the counter 144 starts again a counting operation starting from the numerical value "0". When the numerical value "573" is counted and the output Q1 becomes the high level, the flip-flop 145 is set and the output Q2 becomes the high level. The numerical value "573" is representative of the position where the succeeding true synchronizing signal comes when the disk is rotating at the predetermined rotational speed, as described previously. When the pulse C3 appearing for the first time after separation by 1H (in this case the rotation of the disk is slower and therefore the pulse C3 has become a false synchronizing signal), the same is obtained through the AND gate 143 and the OR gate 147 as a motor control signal D3. Thus, the pulse appearing for the first time after separation by 1H from the previous pulse comes to be obtained as a motor control signal D. Meanwhile, the pulses of the number of 573 amount to 132 $\mu$sec ($=1/4.3218 \times 573$ $\mu$sec). The foregoing would be clearly appreciated with reference to FIG. 12A.

Now description will be made of a case where the rotational speed of the disk has reached a predetermined speed (the output of the rotational speed detecting circuit 15 is the high level). Such case is depicted in FIG. 12B. In such situation, when the counter 144 counts the numerical value "573" so that the output Q2 becomes the high level, the pulses of the pulse train C have already become the high level and these pulses have necessarily become a true synchronizing signal (see FIG. 1). Therefore, the period of the motor control signal D generated based on the pulse C and obtained through the AND gate 143 and the OR gate 147 coincides with the period of 136 $\mu$sec of the normal synchronizing signal. The pulse C which has already become the high level is stored responsive to the rise of the output Q2 in the D-type flip-flop 148 and the output Q4 becomes the high level.

The output Q4 is applied to the predetermined rotational speed detecting circuit 17. The predetermined rotational speed detecting circuit 17 comprises a retrigerable one-shot circuit 171 the quasistable period or the time constant of which has been selected to be larger than 136 $\mu$sec and an integrating circuit 172. Therefore, insofar as the disk maintains the predetermined rotational speed, the one-shot circuit 171 is repetitiously triggered and the integrated output maintains a predetermined level. This output becomes a signal representing the predetermined rotation of the disk. Even in the case where the rotation of the disk has not reached a predetermined number of rotations, it could happen that by chance the pulse C becomes the high level before the counter 144 counts the numerical value "573". In such a case the output Q4 becomes the high level and the one-shot circuit 171 is triggered. However, since such a situation does not take place continuously, the integrated output does not reach the predetermined level in the case of the normal rotational speed.

Now assuming that the rotational speed of the disk is faster than the predetermined speed, the output of the rotational speed detecting circuit 15 is the low level as described previously. Therefore, the AND gate 142 is in an active state and, when the pulse C is obtained, the same is provided through the AND gate 142 and the OR gate 147 as a motor control signal D. More specifically, all the pulses C become a motor control signal D.

According to the embodiment described in the foregoing, the synchronizing signal is detected by applying the reproduced signal to the FM demodulating circuit and a motor control signal is generated in association with the running speed of the recording medium at that time point based on the above described synchronizing signal, whereupon the motor for moving the recording medium is controlled based on the above described motor control signal and therefore a synchronizing signal can be detected even when the running speed of the recording medium has not reached a predetermined speed. As a result, the motor can be controlled with stability and accuracy and accurate digital data demodulation can be achieved. In addition, after once the rotational speed of the motor has reached the predetermined speed, a motor control signal is generated from the synchronizing signal digitally detected. Therefore, it would become possible to utilize a synchronizing signal for compensation in the case where a synchronizing signal is missing, for example, due to dropout, with the result that more accurate digital data demodulation can be achieved.

Figure 7B:
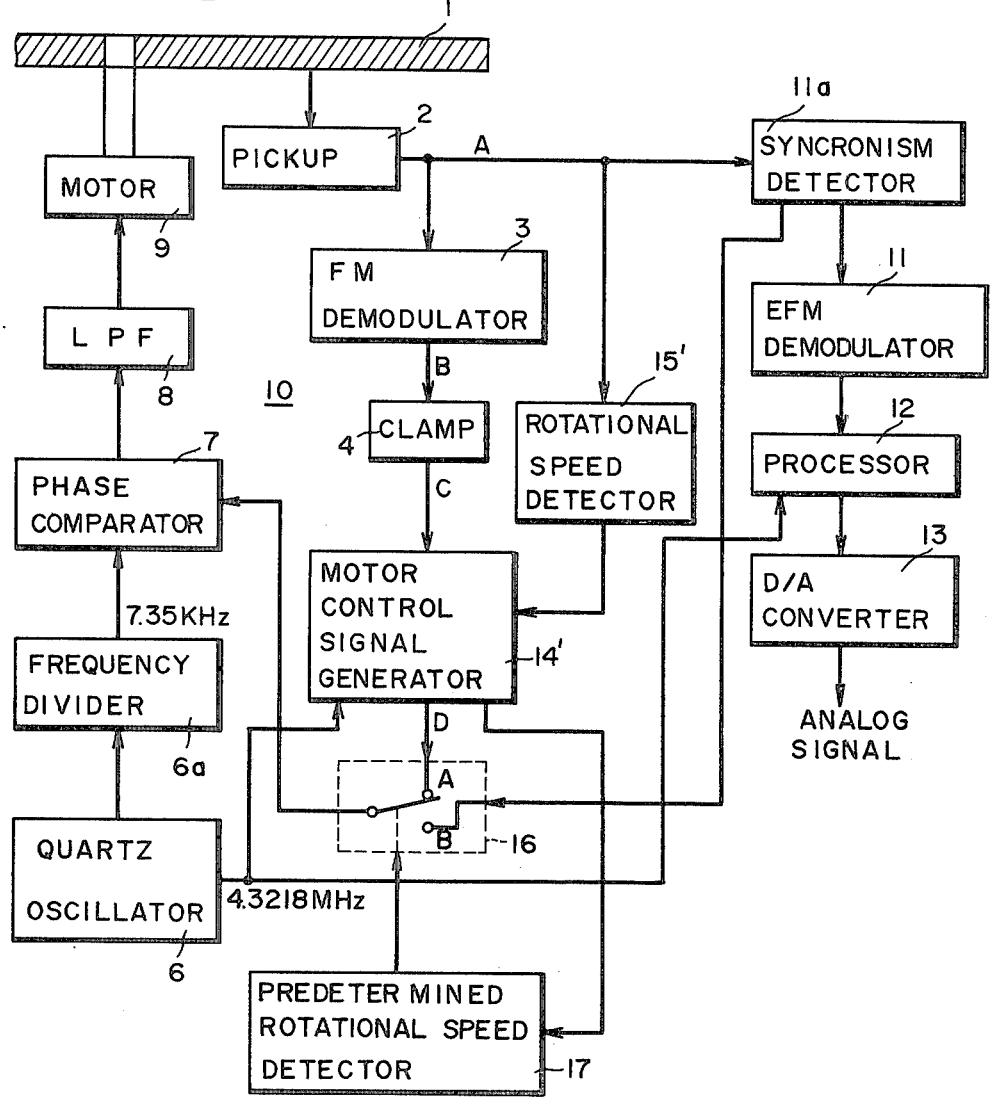
FIG. 7B is a block diagram showing a modification of the FIG. 7A embodiment.

FIG. 7B is a block diagram showing a modification of the FIG. 7A embodiment. In the embodiment shown in FIG. 7B, a rotational speed detecting circuit 15' and a motor control signal generating circuit 14' are different from that of the FIG. 7A embodiment.

Figure 13A:
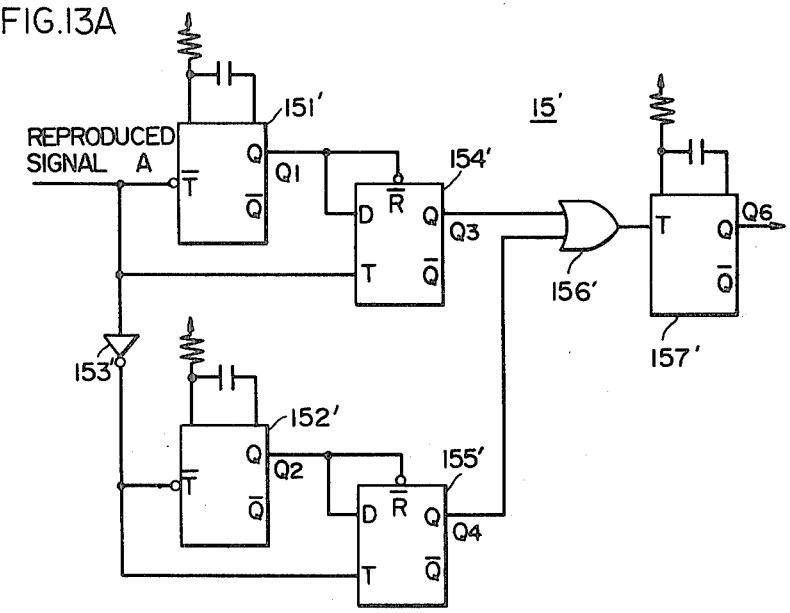
FIG. 13A is a diagram showing another example of the rotational speed detecting circuit of the FIG. 7B embodiment.

FIG. 13A is a diagram showing an example of the rotational speed detecting circuit of the FIG. 7B embodiment. Whereas the previously described FIG. 10 embodiment was adapted to detect the speed based on the maximum signal inversion interval (corresponding to 11 channel bits), the embodiment in discussion is adapted to detect the speed based on the minimum signal inversion interval (corresponding to 3 channel bits). The time constants of the one-shot circuits 151' and 152' have been selected to be the width of 3 channel bits, i.e. 700 nsec ($\approx 3/4.3218$ MHz). The one-shot circuit 151' is connected to receive the reproduced signal from the pickup 2 (FIG. 7B), thereby to measure the length of the low level signal included therein. The one-shot circuit 152' is connected to receive an inversion by the inverter 153' of the reproduced signal, thereby to measure the length of the high level signal included in the reproduced signal.

Figure 13B:
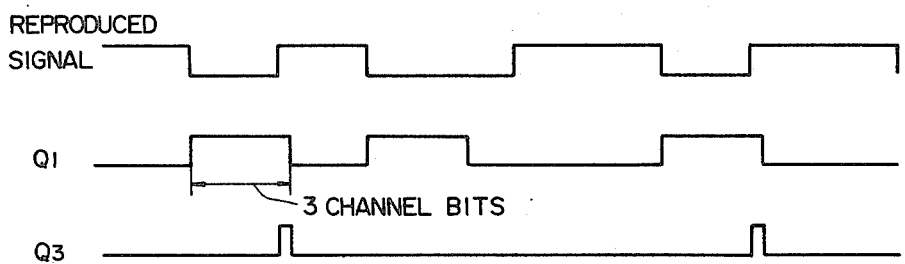
FIG. 13B is a timing chart for explaining the operation of the FIG. 13A diagram.

Now consider a case where the rotational speed of the disk is larger than the predetermined speed. In such a case, the minimum signal inversion interval becomes narrow and therefore a detected signal as shown in FIG. 13B is obtained from the output Q3 of the D-type flip-flop 154'. The signal Q3 is applied to the trigger input of the retriggerable one-shot circuit 157' through the OR gate 156'. Accordingly, a signal of the high level representing that the disk is of the rotational speed larger than the predetermined speed is obtained from the circuit 157'. Meanwhile, the time constant of the one-shot circuit 157' is selected to be larger than 136 $\mu$sec.

Since the one-shot circuit 152' and the D-type flip-flop 155' operate in the same manner as that of the previously described circuits 151' and 154', a more detailed description of such operation will be omitted.

Figure 14:
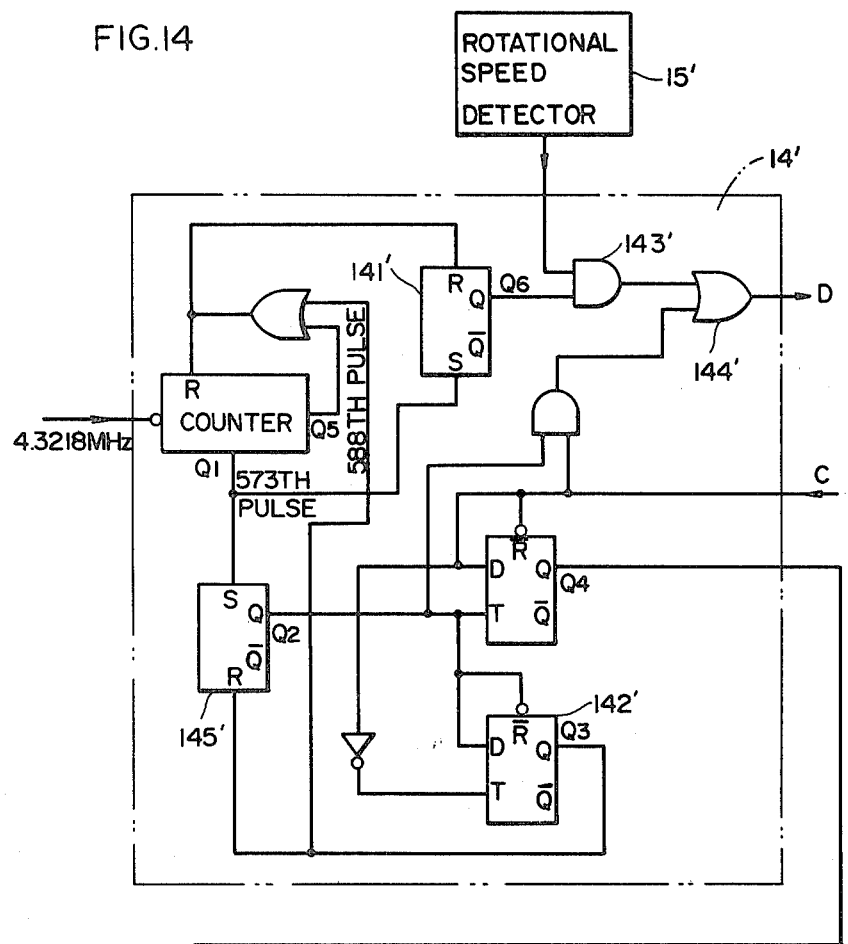
FIG. 14 is a diagram showing another example of the motor control signal generating circuit and the predetermined rotational speed detecting circuit of the FIG. 7B embodiment.
Figure 14:
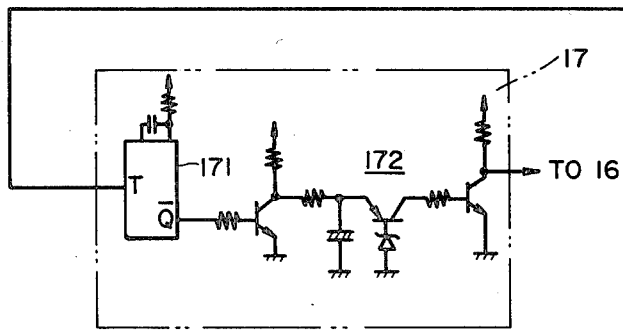
Figure 15A:
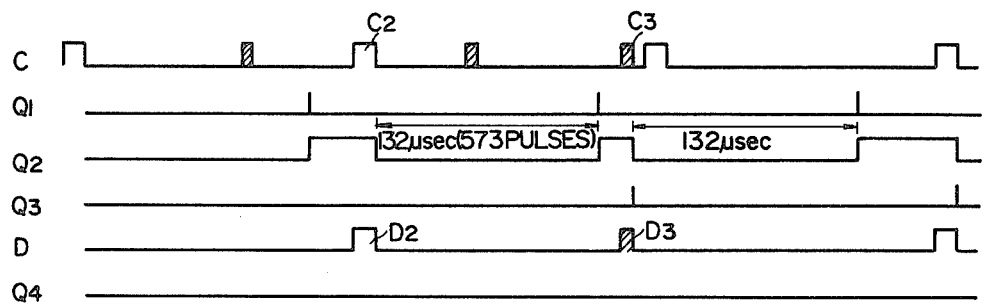
FIGS. 15A to 15C are timing charts for explaining the operation of the FIG. 14 diagram.

FIG. 14 is a diagram showing an example of the motor control signal generating circuit of the FIG. 7B embodiment. The embodiment shown is adapted to generate another pulse separate from the pulse C obtained from the reproduced signal by the flip-flop 141' when the rotational speed of the disk is faster than the predetermined rotational speed, i.e. the output of the rotational speed detecting circuit 15' is the high level so that the above described other pulse and pulse C are obtained as a motor control signal D. More specifically, the flip-flop 141' is set responsive to the 573-th clock pulse and is reset responsive to either the 588-th clock pulse or the output Q3 of the flip-flop 142'. Accordingly, the output Q6 of the flip-flop 141' becomes the high level during the period when the flip-flop 141' is set and the high level pulse is obtained as the above described other pulse through the AND gate 143' and the OR gate 144' as a motor control signal D (see FIG. 15C). Since the other pulse is thus generated, the phase locked loop 10 can operate responsive to the above described other pulse, even if the synchronizing signal from the disk becomes missing due to dropout or the like.

Figure 15B:
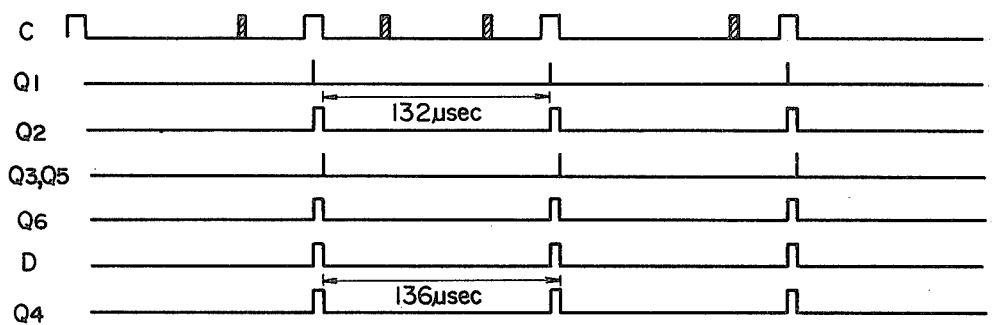
Figure 15C:
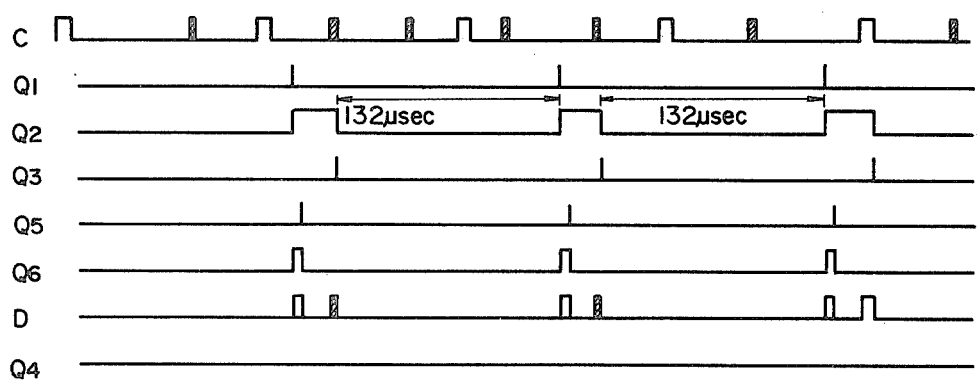

In addition, FIG. 15B indicates a case where the rotational speed of the disk is equal to the predetermined speed. In such a case, although the pulse is generated from the output Q6 of the flip-flop 141', the output Q6 of the flip-flop 141' comes to coincide with the output Q2 of the flip-flop 145' and therefore there is no problem. Furthermore, FIG. 15A indicates a case where the rotational speed of the disk is slower than the predetermined speed. In such a case, the output of the rotational speed detecting circuit 15' comes to be the low level, the AND gate 143' is not enabled, the output of Q6 of the flip-flop 141' is not obtained from the AND gate 143', and therefore there is no problem.

Figure 16:
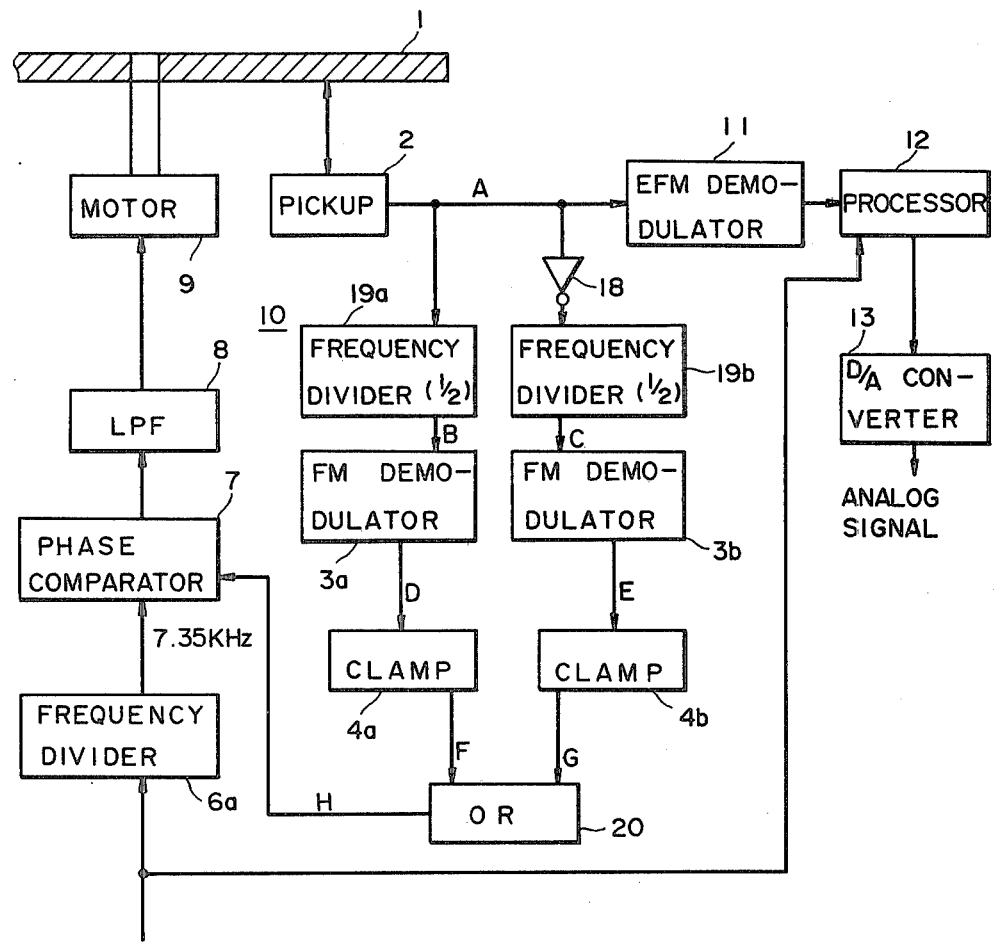
FIG. 16 is a block diagram showing another embodiment of the present invention.
Figure 17:
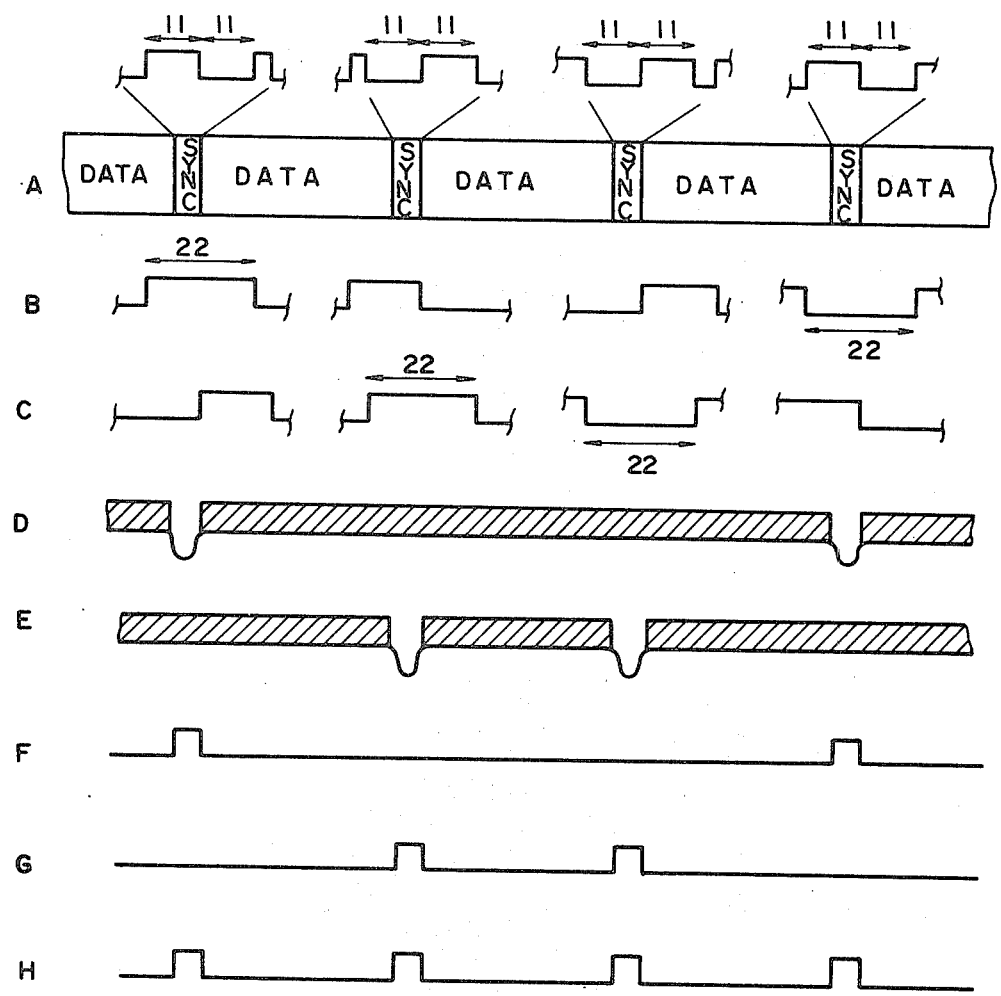
FIG. 17, consisting of A-H is a timing chart for explaining the operation of the FIG. 16 embodiment.

FIG. 16 is a block diagram showing another embodiment of the present invention. The embodiment shown is adapted such that the output signal of the pickup 2 is ½ frequency divided and then the output thereof is FM demodulated. The embodiment is therefore adapted such that the output signal of the pickup 2 is directly applied to one frequency divider 19a and is applied through the inverter 18 to the other frequency divider 19b so that the output signal of the pickup 2 may be frequency divided responsive to both the rise and fall thereof. By doing so, the portion corresponding to the synchronizing signal out of the signals obtained from the frequency dividers 19a and 19b comes to have the signal inversion interval of 22 channel bits as shown as waveforms B and C in FIG. 17, in which the period becomes the maximum among the reproduced signals. The signal invertion interval of the portion corresponding to the data becomes necessarily smaller than 22 channel bits and the period thereof necessarily becomes smaller than the portion corresponding to the synchronizing signal. Therefore, by applying the thus frequency divided outputs B and C to the FM demodulating circuits 3a and 3b, respectively, the frequency of the portion corresponding to the synchronizing signal is the lowest and the demodulated output becomes as shown as waveforms D and E in FIG. 17 in which the demodulated output of the portion corresponding to the synchronizing signal is the lowest. In the case of the FM demodulation, such demodulated signals D and E can be obtained in a given range of the disk rotation number in accordance with the so-called S-curve characteristic. By clamping these demodulated signals D and E to a predetermined level by applying the same to the synchronizing separator circuits or clamping circuits 4a and 4b, respectively, the signals as shown as waveforms F and G in FIG. 17 are obtained. By applying these to the adding or OR circuit 20, the output signal becomes as shown as waveform H in FIG. 17, which can be utilized as an accurate synchronizing signal.

Phase comparison is made of the synchronizing signal H and the reference signal from the frequency divider 6a by means of the phase comparator 7 and the error output is applied to the motor 9 through the low-pass filter 8, whereby the rotation of the motor 9 can be controlled with stability. More specifically, the pickup 2, the inverter 18, the frequency dividing circuits 19a and 19b, the FM demodulating circuits 3a and 3b, the clamping circuits 4a and 4b, the OR circuit 20, the quartz oscillator 6, the frequency divider 6a, the phase comparator 7, the low-pass filter and the motor 9 constitute a phase locked loop 10, whereby the rotation of the motor 9 is controlled with stability and accuracy.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A motor controlling circuit of a reproducing apparatus, comprising:
   a recording medium having digital data and a synchronizing signal for synchronization of said digital data recorded thereon,
   said digital data being digitally recorded on said recording medium in the form of run length limited code,
   said synchronizing signal being, so digitally recorded on said recording medium that a signal inversion thereof is equal or greater than a maximum of a signal inversion interval appearing in said digital data recorded in said run length limited code format,
   a motor for driving said recording medium,
   reproducing means for reproducing said digital data and synchronizing signal from said recording medium being driven by said motor,
   FM demodulating means for FM demodulating the signal as reproduced by said reproducing means,
   control signal generating means for generating a control signal based on the FM demodulated signal as FM demodulated by said FM demodulating means, and
   rotational speed controlling means responsive to said control signal generated by said control signal generating means for controlling the rotational speed of said motor.

2. A motor controlling circuit of a reproducing apparatus in accordance with claim 1, wherein
   said rotational speed controlling means comprises
      reference signal generating means for generating a reference signal,
      phase comparing means for comparing the phases of said reference signal and said control signal, and
      drive controlling means responsive to the output of said phase comparing means for controlling the driving of said motor.

3. A motor controlling circuit of a reproducing apparatus in accordance with claim 2, wherein
said motor has its normal rotational speed corresponding to the rotational speed of said recording medium when said digital data is recorded thereon, and
said control signal generating means comprises
speed detecting means for detecting the speed of said motor and comparing the same with said normal speed for determining when the speed exceeds the normal speed,
clamping means for clamping said FM demodulated signal at a predetermined level,
means responsive to said speed detecting means for providing as said control signal only signals separated from each other by a predetermined time interval or more of the output signals output from said clamping means when the speed of said motor is equal to or slower than said normal speed, and
means responsive to said speed detecting means for providing as said control signal all the output signals output from said clamping means when the speed of said motor is faster than said normal speed.

4. A motor controlling circuit of a reproducing apparatus in accordance with claim 1, which further comprises
means for ½ frequency dividing each of the rise and fall of the signal reproduced from said reproducing means,
said FM demodulating means FM demodulating the respective outputs from said ½ frequency dividing means, and
said control signal generating means including means for clamping the respective outputs from said FM demodulating means at a predetermined level, the output from said clamping means being applied as said control signal.

5. A motor controlling circuit of a reproducing apparatus in accordance with claim 1, wherein
said control signal generating means comprises extracting means for extracting from said FM demodulated signal, as said control signal, only a signal having a periodicity corresponding to said synchronizing signal.

6. A motor controlling circuit of a reproducing apparatus in accordance with claim 5, wherein
said digital data is recorded in said recording medium as a pulse train having a plurality of kinds of signal inversion intervals minimum and maximum of which are predetermined, and
said speed comparing means comprises means responsive to said minimum signal inversion interval for comparing said normal speed with the speed of said motor.

7. A motor controlling circuit of a reproducing apparatus in accordance with claim 5, wherein
said digital data is recorded in said recording medium as a pulse train having a plurality of kinds of signal inversion intervals minimum and maximum of which are predetermined, and
said speed detecting means comprises means responsive to said maximum signal inversion interval for comparing said normal speed with the speed of said motor.

8. A motor controlling circuit of a reproducing apparatus in accordance with claim 1, wherein
said motor has its normal rotational speed corresponding to the rotational speed of said recording medium when said digital data is recorded thereon, and
said control signal generating means comprises
speed detecting means for detecting the speed of said motor and comparing the same with said normal speed for determining when the speed exceeds the normal speed,
clamping means for clamping said FM demodulated signal at a predetermined level,
means responsive to said speed detecting means for providing as said control signal only signals separated from each other by a predetermined time interval or more of the output signals output from said clamping means when the speed of said motor is equal to or slower than said normal speed, and
means responsive to said speed detecting means for providing, as said control signal, the output obtained by adding additional signals to the output signals output from said clamping means when the speed of said motor is faster than said normal speed.

9. A motor controlling circuit of a reproducing apparatus in accordance with claim 8, wherein
said digital data is recorded in said recording medium as a pulse train having a plurality of kinds of signal inversion intervals minimum and maximum of which are predetermined, and
said speed comparing means comprises means responsive to said minimum signal inversion interval for comparing said normal speed with the speed of said motor.

10. A motor controlling circuit of a reproducing apparatus in accordance with claim 8, wherein
said digital data is recorded in said recording medium as a pulse train having a plurality of kinds of signal inversion intervals minimum and maximum of which are predetermined, and
said speed detecting means comprises means responsive to said maximum signal inversion interval for comparing said normal speed with the speed of said motor.

11. A motor controlling circuit of a reproducing apparatus in accordance with any one of claims 1, 2, 6, 7, 5, 3, 8 or 9 wherein
said motor has a predetermined normal rotational speed corresponding to the rotational speed of said recording medium when said digital data is recorded thereon, and which further comprises
digital demodulating means for digitally demodulating the signal as reproduced from said reproducing means, and
said control signal generating means includes means for generating said control signal based on the signal as digitally demodulated from said digital demodulating means after the speed of said motor has reached said normal speed.

12. A method of controlling a motor, comprising the steps of
digitally recording in a recording medium digital data and a synchronizing signal for synchronization of said digital data,
said digital data being digitally recorded on said recording medium in the form of run length limited code,
said synchronizing signal being so digitally recorded on said recording medium that the signal inversion interval thereof is equal to or greater than the maximum one of the signal inversion intervals appeared in said digital data digitally recorded in the form of run length limited code, reproducing said digital data and synchronizing signal from said recording medium, FM demodulating the reproduced signal as reproduced through said reproducing step, generating a control signal based on the FM demodulated signal as FM demodulated through said FM demodulating step, and controlling the rotational speed of a motor for driving said recording medium in accordance with said control signal.

13. A method of controlling a motor in accordance with claim 12, wherein
said control signal generating step comprises the step of extracting a signal having a periodicity corresponding to said synchronizing signal.

14. A method of controlling a motor in accordance with claim 12, wherein
said motor has a predetermined normal speed, and said control signal generating step comprises the steps of
detecting said normal speed with the speed of said motor at that time, and
generating a control signal in different manners depending on the speed of said motor.

15. A method of controlling a motor in accordance with claim 12, which further comprises the steps of
½ frequency dividing the reproduced signal with respect to the rise and fall of said reproduced signal,
FM demodulating said ½ frequency divided signal,
clamping said FM demodulated signal at predetermined levels, and
providing as said control signal the signal obtained by clamping the signal as FM demodulated.

16. A method of controlling a motor in accordance with claim 12, wherein
said motor has a predetermined normal rotational speed corresponding to the rotational speed of said recording medium when said digital data is recorded thereon, and said control signal generating step comprises the steps of
detecting the speed of said motor and comparing the same with said normal speed for detecting when the speed exceeds the normal speed,
clamping said FM demodulated signal at a predetermined level,
providing as said control signal only signals separated from each other by a predetermined time interval or more of the signals obtained through said clamping step when the speed of said motor is equal to or slower than said normal speed, and
providing as said control signal all the signals obtained through said clamping step when the speed of said motor is faster than said normal speed.

17. A method of controlling a motor in accordance with claim 12, wherein
said motor has its said normal rotational speed corresponding to the rotational speed of said recording medium when said digital data is recorded thereon, and said control signal generating step comprises the steps of
detecting the speed of said motor and comparing the same with said normal speed for detecting when said speed exceeds the normal speed,
clamping said FM demodulated signal at a predetermined level,
providing as said control signal only signals separated from each other by a predetermined time interval or more of the signals obtained through said clamping step when the speed of said motor is equal to or slower than said normal speed, and
providing as said control signal the signals obtained by adding additional signals to the signals obtained through said clamping step when the speed of said motor is faster than said normal speed.

18. A method of controlling a motor, comprising the steps of
digitally recording in a recording medium digital data and a synchronizing signal for synchronization of said digital data,
said digital data being digitally recorded on said recording medium in the form of run length limited code,
said synchronizing signal being so digitally recorded on said recording medium that the signal inversion interval thereof is equal to or greater than the maximum one of the signal inversion intervals appearing in said digital data digitally recorded in said run length limited code format,
reproducing said digital data and synchronizing signal from said recording medium,
½ frequency dividing the reproduced signal with respect to the rise and fall of said reproduced signal,
FM demodulating said ½ frequency divided signal,
clamping said FM demodulated signal at predetermined levels, and providing a control signal therefrom, and
controlling said motor in accordance with said control signal.

* * * * *